US011880901B2

(12) United States Patent
Bekan et al.

(10) Patent No.: US 11,880,901 B2
(45) Date of Patent: Jan. 23, 2024

(54) ADAPTING MOBILITY APPLICATIONS TO REGULATORY REQUIREMENTS

(71) Applicant: Bayerische Motoren Werke Aktiengesellschaft, Munich (DE)

(72) Inventors: Adnan Bekan, Munich (DE); Bernardo Mota, Munich (DE); Daniel Wilms, Herzliya (IL)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 311 days.

(21) Appl. No.: 17/312,052

(22) PCT Filed: Dec. 10, 2019

(86) PCT No.: PCT/EP2019/084393
§ 371 (c)(1),
(2) Date: Jun. 9, 2021

(87) PCT Pub. No.: WO2020/126662
PCT Pub. Date: Jun. 25, 2020

(65) Prior Publication Data
US 2022/0028024 A1 Jan. 27, 2022

(30) Foreign Application Priority Data

Dec. 21, 2018 (EP) .................................. 18215788

(51) Int. Cl.
*G06Q 50/30* (2012.01)
*G01C 21/34* (2006.01)
(Continued)

(52) U.S. Cl.
CPC ......... *G06Q 50/30* (2013.01); *G01C 21/3461* (2013.01); *G01C 21/3664* (2013.01);
(Continued)

(58) Field of Classification Search
CPC ............. G06Q 50/30; G06Q 10/06313; G06Q 10/06315; G06Q 30/0284; G01C 21/3461;
(Continued)

(56) References Cited

U.S. PATENT DOCUMENTS 10,093,252 B2 * 10/2018 Zych ..................... B60R 16/037
10,169,735 B2    1/2019 Lund et al.
(Continued)

FOREIGN PATENT DOCUMENTS

CA           3083799 A1 *  7/2019  ........... G01C 21/343
CN         108883764 A      11/2018
(Continued)

OTHER PUBLICATIONS

International Search Report (PCT/ISA/210) issued in PCT Application No. PCT/EP2019/084393 dated Jan. 23, 2020 (two (2) pages).
(Continued)

*Primary Examiner* — Atul Trivedi
(74) *Attorney, Agent, or Firm* — Crowell & Moring LLP (57) ABSTRACT

A method for determining one or more transportation parameters indicative of one or more modes of transportation of a plurality of modes of transportation is provided. Each mode of transportation of the plurality of modes of transportation is indicative of transportation of one or more users in a transportation environment. The method includes receiving a transportation request from a user device; determining the one or more transportation parameters based on the transportation request, one or more transportation mode parameters for each mode of transportation of the plurality of modes of transportation, the one or more transportation mode parameters being indicative of a respective mode of transportation, and one or more environmental parameters indicative of the transportation environment in which the
(Continued)

one or more modes of transportation are destined to be used; and providing the one or more transportation parameters to the user device.

17 Claims, 4 Drawing Sheets

(51) Int. Cl.
    *G01C 21/36*     (2006.01)
    *G01W 1/02*     (2006.01)
    *G06Q 10/0631*     (2023.01)
    *G06Q 30/0283*     (2023.01)
    *G07C 5/00*     (2006.01)

(52) U.S. Cl.
    CPC ........... *G01C 21/3691* (2013.01); *G01W 1/02* (2013.01); *G06Q 10/06313* (2013.01); *G06Q 10/06315* (2013.01); *G06Q 30/0284* (2013.01); *G07C 5/008* (2013.01)

(58) Field of Classification Search
    CPC . G01C 21/3664; G01C 21/3691; G01W 1/02; G07C 5/008
    USPC ........................................................ 701/423
    See application file for complete search history.

(56) References Cited

U.S. PATENT DOCUMENTS

| | | | | |
|---|---|---|---|---|
| 2016/0371276 | A1* | 12/2016 | Furtado | G06F 16/24578 |
| 2017/0255966 | A1* | 9/2017 | Khoury | B60W 40/00 |
| 2018/0121508 | A1* | 5/2018 | Halstvedt | G06F 16/24545 |
| 2018/0158166 | A1* | 6/2018 | Tulabandhula | G06Q 10/02 |
| 2018/0165783 | A1* | 6/2018 | Edakunni | G06Q 50/30 |
| 2018/0265074 | A1* | 9/2018 | Lovelace | B60K 6/485 |
| 2018/0326997 | A1* | 11/2018 | Sweeney | G01C 21/3438 |
| 2018/0374002 | A1* | 12/2018 | Li | G06Q 10/02 |
| 2019/0265868 | A1* | 8/2019 | Penilla | H04L 63/083 |
| 2020/0378780 | A1* | 12/2020 | Beaurepaire | G01C 21/3697 |
| 2021/0285777 | A1* | 9/2021 | Ostadzadeh | G01C 21/3617 |
| 2022/0252414 | A1* | 8/2022 | Lerner | G06Q 50/28 |

FOREIGN PATENT DOCUMENTS

| | | | |
|---|---|---|---|
| TW | 201826217 A | | 7/2018 |
| WO | WO 2010/074668 A1 | | 7/2010 |
| WO | WO 2017/176122 A1 | | 10/2017 |
| WO | WO-2017216626 A1 | * | 12/2017 ......... G06Q 20/0457 |

OTHER PUBLICATIONS

Written Opinion (PCT/ISA/237) issued in PCT Application No. PCT/EP2019/084393 dated Jan. 23, 2020 (six (6) pages).

Extended European Search Report issued in European Application No. 18215788.3 dated Apr. 29, 2019 (four (4) pages).

European Communication pursuant to Article 94(3) EPC issued in European Application No. 18 215 788.2 dated Nov. 18, 2020 (10 pages).

Chinese-language Office Action issued in Chinese Application No. 2019800822295 dated Aug. 21, 2023 with English translation (13 pages).

* cited by examiner

ADAPTING MOBILITY APPLICATIONS TO REGULATORY REQUIREMENTS

BACKGROUND AND SUMMARY OF THE INVENTION

The present disclosure relates to systems and methods for determining one or more transportation parameters configured to characterize one or more modes of transportation of a plurality of modes of transportation. In particular, the present disclosure relates to systems and methods for determining one or more transportation parameters in order to facilitate adapting mobility applications to regulatory requirements prone to dynamic changes and/or variable requirements, for example payment requirements.

Mobility in urban areas has undergone a multitude of changes with respect to regulatory requirements in recent years. Due to issues commonly associated with the growth of individual transport in urban areas, many cities have taken steps to regulate individual city traffic more and more, for example by charging a city toll or by banning or otherwise restricting particular vehicles from entering or travelling through certain parts of the city.

It is expected that regulatory requirements will become even more complex and diverse in the future, confronting users with potentially very different sets of regulations and requirements as users travel within a single city, from city to city, or from country to country. It is to be expected that in addition to known regulations, an increasing number of additional factors need to be taken into consideration, such as local emissions caused by a vehicle (e.g. measured local air quality or emission standards generally fulfilled by the vehicle), dynamic effects impacting city traffic (e.g. rush hours, particular events, construction zones), and other factors.

For the user of a vehicle, this situation makes it difficult to travel anywhere within a city and, in particular, to travel from city to city, since each city, even within a single country, might implement different regulations. Further, driving within, into, and/or through cities might be subject to regulations changing over time, for example, when restrictions due to low air quality or events are implemented temporarily or permanently.

Likewise, traffic or transport authorities and city governments may want to implement variable and/or dynamic regulations that consider certain parameters based on which individual city traffic may be directed, restricted, or controlled more effectively. For example, it might be beneficial to place restrictions on individual city traffic depending on a current measured air quality or other factors, in order to improve traffic flow and/or to improve air quality. In some cases, regulations may be put in place that disallow certain vehicles (e.g. vehicles using internal combustion engines (ICE)) from entering certain areas in the city. In other cases, such regulations may be implemented only on particular weekdays or at particular times during a day.

Further, it might be beneficial to provide incentives to users of public and/or individual transport for using a particular mode of transportation depending on a number of factors. For example, under some conditions, a number of users may need to be provided with an incentive for using public transport (e.g. during times of low air quality or high congestion), while under some other conditions, it may be beneficial to provide a number of users with an incentive for using other modes of transportation (e.g. at times of peak utilization of public transport or when public transport services experience problems or delays).

Therefore, there is a need for systems and methods that allow for users to determine an optimized mode of transportation, which are able to take into account different changing and/or variable regulatory requirements.

Further, there is a need for systems and methods that allow for regulatory requirements to be determined and/or enforced in order to optimize traffic, in particular urban traffic.

Additionally, there is a need for systems and methods that seamlessly integrate into existing systems, for example those based on related art navigation systems in vehicles and those typically found on a user's smart phone.

There is, in particular, a need for a backend component (e.g. server(s), service(s)) that enable the implementation of such systems and methods and which provide an infrastructure, network, and/or backend connecting user devices (e.g. smart phones, infotainment systems in cars) with the backend components providing the services.

One or more of the objects specified above are substantially achieved by methods, backend components, user devices, and systems for determining one or more transportation parameters in accordance with any one of the appended claims, which alleviate or eliminate one or more of the described disadvantages and which realize one or more of the described advantages.

In a first aspect according to the invention, there is provided a method for determining one or more transportation parameters indicative of one or more modes of transportation of a plurality of modes of transportation. Each mode of transportation of the plurality of modes of transportation is indicative of transportation of one or more users in a transportation environment. The method comprises receiving a transportation request from a user device; determining the one or more transportation parameters based on: the transportation request; one or more transportation mode parameters for each mode of transportation of the plurality of modes of transportation, the one or more transportation mode parameters being indicative of a respective mode of transportation; and one or more environmental parameters indicative of the transportation environment in which the one or more modes of transportation are destined to be used; and providing the one or more transportation parameters to the mobile device.

In a second aspect according to aspect 1, the environmental parameters include regulatory parameters indicative of one or more restrictions placed on the transportation of the one or more users in the transportation environment; optionally wherein the regulatory parameters include one or more of: payment parameters indicative of one or more payments associated with the use of one or more modes of transportation; and restriction parameters indicative of the applicability of one or modes of transportation.

In a third aspect according to any one of aspects 1 or 2, the one or more environmental parameters include one or more of: one or more regions, each region of the one or more regions being configured to be associated with one or more transportation parameters; one or more temporal parameters, each temporal parameter of the one or more temporal parameters being indicative of a time point, time period, day, time of day, weekday, weekend day, and/or holiday; one or more weather parameters, each weather parameter of the one or more weather parameters being indicative of a weather condition; optionally a weather condition including precipitation, temperature, wind direction, wind speed, radiation, wind-chill, and/or visibility; and one or more event parameters, each event parameter of the one or more event parameters being indicative of an event type, an event occurrence, and an event period.

In a fourth aspect according to any one of aspects 1 to 3, the one or more transportation parameters are indicative of a least two modes of transportation of the plurality of modes of transportation, enabling transportation of the one or more users in a transportation environment based on the at least two modes of transportation.

In a fifth aspect according to any one of aspects 1 to 4, the method further comprises receiving the one or more environmental parameters from one or more databases in data communication with one or more backend components.

In a sixth aspect according to the invention, there is provided a method for determining one or more transportation parameters indicative of one or more modes of transportation of a plurality of modes of transportation. Each mode of transportation of the plurality of modes of transportation is indicative of transportation of one or more users in a transportation environment. The method comprises: providing a transportation request to one or more backend components; receiving a response from the one or more backend components; and determining the one or more transportation parameters indicative of the one or more modes of transportation based on the response.

In a seventh aspect according to aspect 6, the transportation request includes current transportation parameters indicative of a transportation mode currently in use by a user or indicative of a transportation mode a user intends to use in association with the transport request.

In an eighth aspect according to any one of aspects 6 or 7, the method further comprises: determining a preferred mode of transportation based on the one or more transportation parameters; and optionally providing the preferred mode of transportation to a navigation system implemented on a user device; or providing the preferred mode of transportation to a user.

In a ninth aspect according to any one of aspects 6 to 8, the method further comprises: providing the one or more transportation parameters to a navigation system implemented on a user device; or providing the one or more transportation parameters to a user.

In a tenth aspect according to any one of aspects 6 to 9, the method further comprises providing the one or more transportation parameters to a navigation system configured to determine a route based on the transportation parameters; optionally wherein the navigation system is implemented on a user device, preferably on a control unit of a vehicle and/or on a mobile device.

In an eleventh aspect according to any one of aspects 6 to 10, the transportation request comprises one or more of: a starting location; a destination; one or more routes, each route of the one or more routes being indicative of a transportation connection between a starting location and a destination.

In a twelfth aspect according to any one of aspects 1 to 11, the transportation request includes one or more second transportation parameters indicative of one or more modes of transportation of a plurality of modes of transportation; optionally wherein the one or more second transportation parameters are indicative of parameters pertaining to a vehicle and/or a user.

In a thirteenth aspect according to the invention, there is provided a backend component for providing one or more transportation parameters, the backend component being configured to execute the method in accordance with the present invention, in particular in accordance with any one of the preceding aspects from 1 to 5 and 11 to 12. Optionally, the backend component includes one or more servers and/or one or more services.

In a fourteenth aspect according to the invention, there is provided a user device for determining one or more transportation parameters, the user device being configured to execute the method in accordance with the present invention, in particular in accordance with any one of the preceding aspects from 6 to 12.

In a fifteenth aspect according to the invention, there is provided a system comprising the backend component according to aspect 13 and the user device according to aspect 14.

The accompanying drawings disclose exemplifying and non-limiting aspects in accordance with embodiments of the present invention. In the drawings, like reference numerals denote the same, similar, or identical components.

DETAILED DESCRIPTION OF THE DRAWINGS

In the following detailed description, unless specifically stated otherwise, identical, same, or similarly functioning elements are denoted using identical reference numerals.

Figure 1:
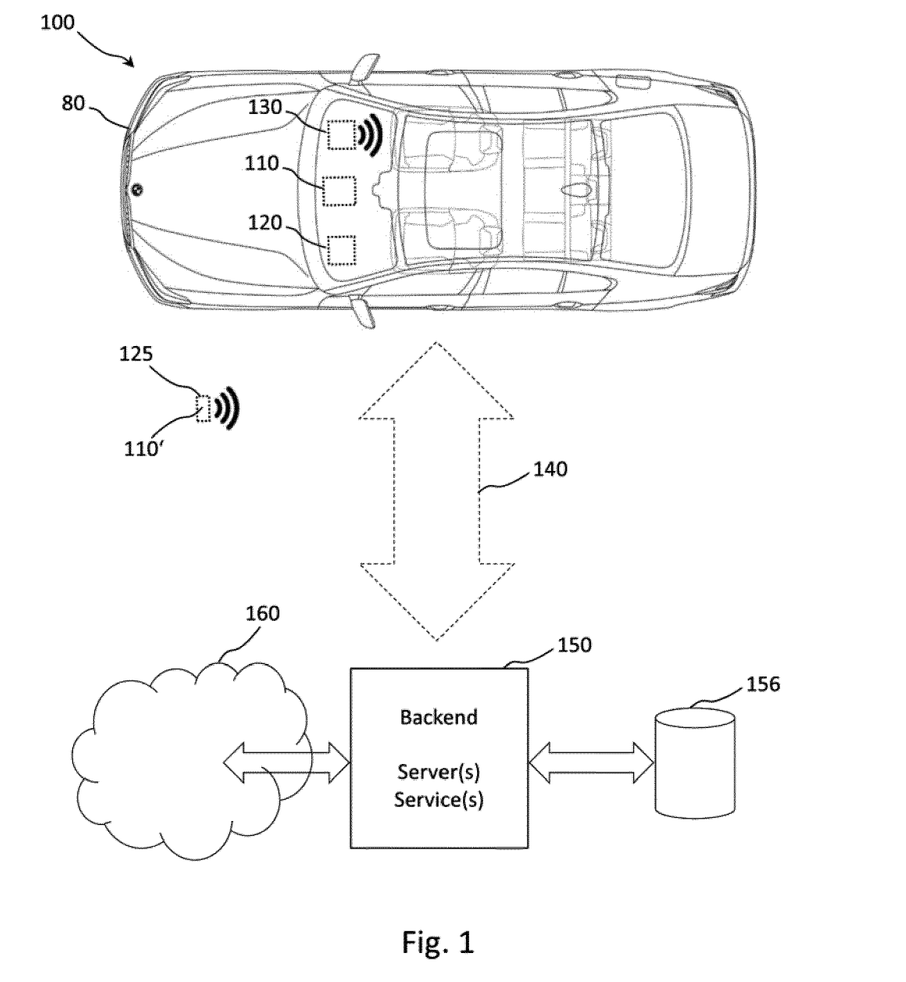
FIG. 1 shows a schematic view of a system for determining one or more transportation parameters in accordance with embodiments of the present disclosure.

FIG. 1 shows a schematic view of a system 100 for determining one or more transportation parameters in accordance with embodiments of the present disclosure. The system 100 may be implemented, at least in part, on a control unit 120 of a vehicle 80 and/or on a mobile device 125. The system 100 may further be implemented, at least in part, on a backend component 150 (e.g. server, services, such as databases). In the embodiment shown in FIG. 1, the system 100 comprises, and is implemented on, at least one of the control unit 120 and the mobile device 125, and on the backend component 150.

The vehicle 80 may include a vehicle with an internal combustion engine (ICE), a hybrid electric vehicle (HEV), a plug-in hybrid electric vehicle (PHEV), a battery electric vehicle (BEV), a fuel cell electric vehicle (FCEV), or derivative or variation thereof.

The vehicle 80 includes, in addition to the control unit 120, a communication unit 130 configured to provide the control unit 120 with data communication 140 capabilities. In this manner, control unit 120, and other components operably coupled to the control unit 120 may enter into data communication 140 with other components and/or devices, for example backend component(s) 150 (e.g. server, services, such as databases) or mobile devices 125 (e.g. smart phones, tablets) of a user (not shown). Generally, communication unit 130 may provide the control unit 120 and/or mobile devices 125 with data communication 140 to any (cloud) service 160 accessible through a network (e.g. the internet). Data communication may be based on any communications standard, for example GSM, EDGE, HSUPA, LTE, 5G or other. Further, mobile device 125 may be operably coupled to control unit 120 using corresponding data communication standards (e.g. Bluetooth, Wifi). In this manner, control unit 120 may enter into data communication 140 via mobile device 125 and/or mobile device 125 may enter into data communication 140 via control unit 120. Further, vehicle data characterizing the vehicle 80 and/or an operating condition of the vehicle 80 may be transmitted to the mobile device 125 and/or via data communication 140.

Within the scope of this disclosure, control unit 120 and mobile device 125 may both be referred to as a "user device", thereby indicating that, unless otherwise stated, the use of the respective devices and/or the data communication 140 with the backend component 150 is transparent to the user and the interaction of the user with any respective device 120, 125 is substantially identical.

Vehicle 80 may further include a user interface 110 configured to allow a user of the vehicle 80 to interact with system 100. Additionally or alternatively, mobile device 125 may further include a user interface 110' configured to allow a user of the mobile device 125 to interact with system 100. In preferred embodiments, the user may seamlessly make use of system 100 using both user interfaces 110 and 110', with the option to change from one interface to another and/or to alternate between both interfaces 110 and 110'. User interfaces 110 and/or 110' may include an input/output component, for example a touch screen. The system 100 may be provided with further user interfaces (not shown) that allow a user to interact with the system 100, for example by using a web browser, speech recognition, gesture control, or other modes of input/output.

In a first preferred embodiment, system 100 is implemented, at least in part, on the control unit 120 of the vehicle 80, in which case the control unit 120 of the vehicle 80 may be in data communication 140 with the backend component 150 either directly (e.g. using communication unit 130) or indirectly (e.g. using mobile device 125). A user may interact with system 100 using one or both of user interfaces 110 and 110', while in this first preferred embodiment, the user interaction may be performed primarily using the user interface 110 of the vehicle 80.

In a second preferred embodiment, system 100 is implemented, at least in part, on the mobile device 125 of a user, in which case the mobile device 125 may be in data communication 140 with the backend component 150 either directly (e.g. using a data communication standard) or indirectly (e.g. using the control unit 120 and the communication unit 130 of the vehicle 80). A user may interact with system 100 using one or both of user interfaces 110 and 110', while in this second preferred embodiment, the user interaction may be performed primarily using the user interface 110' of the mobile device 125.

In a third preferred embodiment, system 100 is implemented, at least in part, on the mobile device 125 of a user. Further, the mobile device 125 is in data communication 140 with the backend component 150 solely directly (e.g. without using the control unit 120 and/or the communication unit 130 of the vehicle 80). This third preferred embodiment applies to a situation, in which the user is not using a vehicle 80 and/or in which the user uses a mode of transportation that does not require the use of a vehicle 80 (e.g., when changing from a vehicle 80 to public transport). The user may then interact with system 100 using the user interface 110' of the mobile device 125.

The backend component 150 may include one or more resources, for example servers and/or services and may be configured to provide (further) data communication to such server(s) and service(s). The server(s) and/or service(s) may be connected directly to or integrated into backend component 150 (see, e.g., database 156) or indirectly connected via a network connection (see, e.g., cloud services 160). The backend component 150 may be in permanent data communication 140 with control unit 120 and/or mobile device 125 or the data communication 140 may be activated when needed.

The backend component 150 has access to environmental parameters configured to characterize a transportation environment in which one or more modes of transportation are destined to be used. The modes of transportation may refer to one or more road networks (e.g. individual traffic using a privately owned or operated vehicle, or a temporarily rented vehicle or car-sharing vehicle), one or more public transportation networks (e.g. busses, trams, subways, trains), one or more transportation service providers (e.g. ride-sharing, taxi service, Uber, Lyft), one or more networks of paths and walkways (e.g. for pedestrian traffic, bike traffic, including bike rental/sharing), and other modes. In an urban environment, the environmental parameters may include, in particular, regulatory parameters configured to characterize conditions (e.g., restrictions, exemptions, limitations) for the use of the one or more modes of transportation, as well as zoning information (i.e. definitions of particular zones or regions, to which one or more regulatory parameters apply). The environmental parameters may further include other conditions (e.g. non-regulatory), such as weather information (e.g., precipitation, temperatures, wind direction or speed, radiation such as UV index, wind-chill, visibility) including air quality and/or particulate emissions (e.g., including $NO_2$, $NO_3$, CO, or other chemical compounds, substances, or particulates contained in the air), event information (e.g. construction sites, events attracting many visitors, one-time events, regularly occurring events), traffic information (e.g. current or expected congestion, peak times), or information about the disruption of services. Environmental parameters may be, in particular, time-dependent, such that any information or parameter may be associated with a time point or time interval that may occurring once, several times, or be a regularly recurring element (e.g. "weekdays", "weekdays between 7 am and 9 am", "on public holidays", "off-season", "from November to March", "at 12 pm", "Tue and Thu from 10 am to 2 pm", etc.).

The backend component may comprise one or more servers and/or one or more services which, in turn, can access other components, for example one or more databases 156 and/or a plurality of servers and/or services accessible via a network connection, for example in the cloud 160. It is noted that each of the one or more servers and/or one or more services may be operated by a different entity, such that a user can transparently access the system 100 without necessarily needing to know which individual servers/services 150 to access and/or who the provider of any such server or service would be.

For example, environmental parameters may be provided by several different entities. A first entity, for example a public transport provider, may provide scheduling times of busses, trams, and subways, as well as associated data about fares, service disruptions (e.g. when services are affected by special events or malfunctions), and other related information. Another public transport provider may provide the same or similar information about an urban and/or regional train network. Yet another entity, a provider of ride sharing services, may provide information about available rides, pricing schemes, special offers, etc. Still another entity, for example the city transport authority, may provide information relating to the urban and/or regional road network, for example information relating to current and/or expected/predicted congestion, construction sites, tolls, parking fees, and/or restrictions. Information about parking locations, along with any associated information (e.g. parking fees, special offers), may also be provided by privately operated businesses.

In preferred embodiments, processing steps may be performed by any one of the control unit 120, the mobile device 125, and/or backend component 150, or by a component accessible via backend component 150, depending on the processing requirements and the context. In preferred embodiments, resource-intensive processing is performed by the backend component 150 or by a component accessible via backend component 150, such that the control unit 120 and/or the mobile device 125 remain available for other tasks, in particular those requiring local execution. Resource-intensive processing may include processing which cannot be performed efficiently (or not at all) on control unit 120 and/or mobile device 125 due to limited resources, for example in terms of processing power, available memory resources, and/or data availability and/or bandwidth considerations.

In particular, environmental parameters may include regulatory parameters indicative of one or more conditions (e.g., restrictions, exemptions, limitations) placed on the transportation of users in the transportation environment.

In one example, environmental parameters and/or regulatory parameters may include, for example, a representation of a city toll system, based on which a toll for the use of certain modes of transportation is imposed on a user. The regulatory parameters may define that using a vehicle 80 within a specific zone in the city (e.g. the city center) is subject to a city toll, which can be defined as a cost per km or per minute. The city toll may further be based on a driving mode of a vehicle 80 (e.g. electric, ICE), on the time of day and/or day of week, and/or other factors. In this manner, a traffic or transportation authority may provide zoning information in which each zone may be associated with a specific city toll based on the aforementioned factors.

A first zone indicative of the inner city center, for example, may be associated with the condition, i.e. a restriction, that only electric vehicles (or hybrid vehicles in electric mode) may enter the first zone. The first zone may require that electric vehicles are subject to a city toll of 0.04 €/min at all times.

A second zone indicative of an adjacent part of the city center, for example, may not impose a restriction on non-electric vehicles (e.g. non-electric vehicles may be used). The second zone may require that all vehicles are subject to a city toll based on a driving mode: 0.06 €/km for ICE vehicles and 0.02 €/km for electric vehicles and hybrid vehicles operated in electric mode.

A third zone indicative of another part of the city may be associated with a time-based and driving-mode-based city toll. During weekday peak times (e.g. rush hour) from 7 am to 9 am and from 4 pm to 6 pm on weekdays, the third zone may require that all vehicles are subject to a city toll of 0.05 €/km. During all other times, all ICE vehicles are subject to a city toll of 0.02 €/km and electric vehicles are not subject to a city toll.

A fourth and temporary zone indicative of an area around a football stadium may be associated with a particular parking fee and city toll, but only for the duration of events being held at the stadium. During such times, all vehicles in the fourth zone transporting more than three passengers including the driver for may be subject to a parking fee of 5 €/h and all other vehicles transporting three or fewer passengers may be subject to a parking fee of 8 €/h and, additionally to a city toll of 0.06 €/min of driving.

Generally, there exist a multitude of environmental parameters, based on which regulation may be defined:
  Location; for example, zones defined based on coordinates, tiles, segments, elements of road network
  Time of day; for example, peak times, rush hours
  Day of week; in particular weekdays, weekends, holidays
  Weather conditions; for example, precipitation, temperatures, wind direction or speed, radiation (e.g. UV index), wind-chill, visibility
  Event information; for example, one-time events, regularly occurring events
  Air quality and/or particulate emissions (e.g., including $NO_2$, $NO_3$, CO, or other chemical compounds, substances, or particulates contained in the air)
  Traffic density Further, there exist a multitude of transportation parameters, based on which regulation may be defined. The transportation parameters may, in particular, include parameters indicative of a mode of transportation being used (e.g. a vehicle 80 being operated):
  Mode of transportation; for example, vehicle, public transport, bus, tram, train, subway
  Mode of operation; for example, vehicle using ICE, hybrid or electric vehicle using electric drive
  Statistical usage information (e.g. a share of electrically driven km with a vehicle—e.g. a PHEV—for the past 30 days in a pre-defined urban area)
  Type of vehicle; for example, ICE, Diesel, Gasoline, HEV, PHEV, BEV
  Specifications and/or properties; for example, emissions standard (e.g. EU4, EU5, EU6), emission properties (e.g. re $CO_2$, NOx, particulate matter)
  Vehicle identification number (VIN) of a vehicle
  Positioning information (e.g. GPS)
  Odometrical information (e.g. km, miles)
  Time of operation; for example, planned travel times, time spent at different locations and/or within certain areas (e.g. regions)
  Routing information; for example, intended route, waypoints
  Registration country of the vehicle
  Vehicle for private or corporate use
  Weight of the vehicle
  Number of axles of the vehicle
  Power rating/output of the vehicle
  Specific user information, e.g. income level The examples above may be combined in any manner desired, such that basically any combination of environmental, regulatory, and/or transportation parameters may be used in directing, regulating, and/or controlling transportation.

Figure 2:
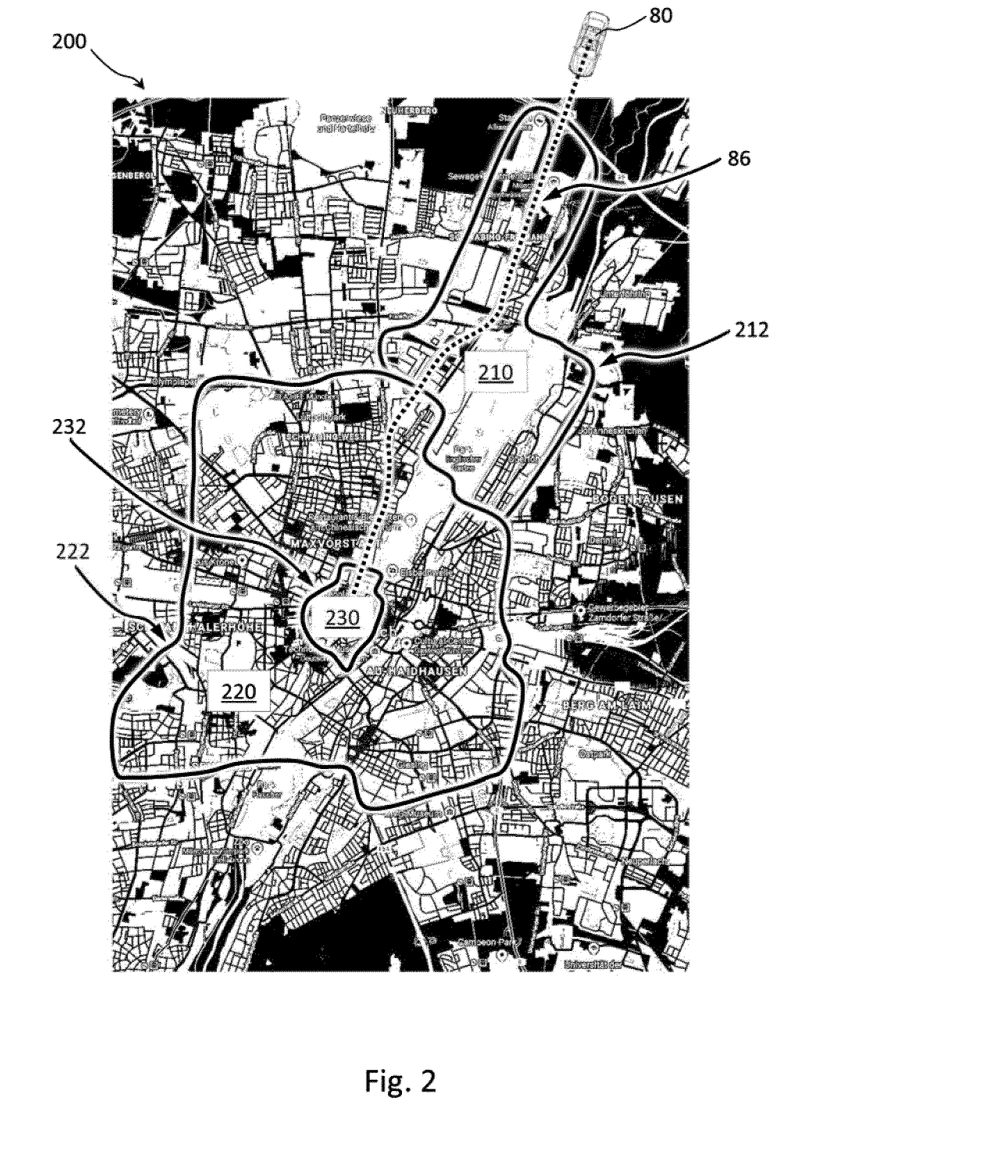
FIG. 2 shows an example scenario for the use of the system in accordance with embodiments of the present disclosure.

It is noted that the transportation request may include one or more of the transportation parameters described above. This means, that a user device may be configured to communication one or more of the above transportation parameters, in form of a transportation request, to one or more backend components 150, such that the one or more backend components can take such transportation parameters into account. In particular, the user device 120, 125 may, thus, be able to provide particular parameters of the vehicle 80 (e.g. mode of operation, statistical usage information, type of vehicle, specifications and/or properties, VIN, positioning information, odometrical information, time of operation, routing information, registration information, vehicle use indication, weight, number of axles, power rating/output of the vehicle, etc.). Further, user information may be included in the transportation request, the user information being indicative of a user (e.g. gender, age, income level, current state/condition). The user device 120, 125 may, thus, be able to provide particular details about the user. Such user-related parameters may be strictly enforced based on privacy concerns and/or regulations, and may be subject to a confirmation of the user that they are willing to share such information with the backend component(s) 150. FIG. 2 shows an example scenario for the use of system 100 in accordance with embodiments of the present disclosure. FIG. 2 schematically illustrates an urban area 200 which provides a user with one or more modes of transportation, such as a road network for use with a vehicle 80, public transport (e.g. busses, trams, subways, trains), and a network of paths and sidewalks for use on foot and/or by bike. For reasons of simplicity, FIG. 2 focuses on a scenario in which a user is navigating the urban area 200 in a vehicle 80 (not to scale) on a route 86 (see dotted line in FIG. 2). Other modes of transportation are equally applicable without deviating from key concepts of the present disclosure.

The urban area 200 is shown as being partitioned into several regions 210, 220, and 230, defined by respective boundaries 212, 222, and 232. The partitioning shown in FIG. 2 includes polygonal regions (or boundaries 212, 222, 232), which may be freely defined based on, for example, coordinates (e.g. GPS coordinates), whereas a series of coordinates are configured to define a respective region (e.g. in the form of a closed polygon). The center of the city shown in the urban area 200, for example, is denoted by the region 230 as shown roughly in the center of urban area 200 and as delimited by boundary 232. A region surrounding the immediate city center and, thus, region 230, is denoted by region 220, which is delimited by boundary 222. As shown, region 220 includes a larger portion of the urban area 200 (i.e. much larger that the portion covered by region 230). Generally, however, the partitioning illustrated in FIG. 2 is merely an example and concepts of the present disclosure generally allow for any polygonal (or other) partitioning and, thus, regions of arbitrary size and/or coverage. FIG. 2 further shows region 210 which is delimited by boundary 212 and which is situated adjacent to and roughly north of region 220 (the direction "north" being defined as facing towards the top of FIG. 2). Regions 210 and 220 share part of their respective boundaries 212 and 222. Region 230 is located entirely within region 220, without having a common boundary.

Generally, many other ways of partitioning the urban area 200 may be implemented. For example, a regular partitioning based on rectangular or quadratic tiles may be applied, such that the urban area 200 is divided into tiles (e.g., like a chess board). Any region could, thus, be defined in terms of one or more tiles. This may entail advantages in spatial processing (e.g. determining whether a geographic location is within a particular region or not). Further, the tiling and/or partitioning may be dependent on one or more parameters, for example demographic parameters (e.g. zoning information, population density), structural parameters (e.g., street or road networks, squares, or landmarks), or other parameters that allow for a tiling/partitioning. In this way, tiles may be defined, which pertain to particular zones or which cover a predetermined portion of the population.

Other ways of partitioning the urban area 200 may include partitioning based on structural features, such as a road network, a public transport network, or a virtual network (e.g. a number of bus lines operating in the urban area 200). Depending on the modes of transportation used and/or on the individual application, different types of partitioning may be beneficial and/or provide certain advantages.

Different regions, for example regions 210, 220, 230, may be provided with particular environmental and/or transportation parameters for different modes of transportation. The environmental and/or transportation parameters may include a multitude of different parameters, for example pertaining to payment (e.g. city toll, congestion charge, parking fees, cost for public transport), to general use (e.g. conditions or restrictions for certain types of vehicles), temporary parameters (e.g. surcharges during peak hours, restrictions during certain times during a day or on certain days during the week), incentives (e.g. dynamic pricing during peak hours, special events, gamification, social scoring), and other categories. System 100 is configured to integrate several different transportation parameters such as those described above.

For example, a city toll may be generally in place, but the pricing scheme may be different for each region 210, 220, 230. Travelling with a vehicle 80 in regions 220 and 230, for example, may be subject to a city toll, with the toll for region 230 being higher than the toll for region 220. Further, region 210 may also be subject to a toll lower than the toll in region 220. System 100 may be configured to provide, upon request, toll information based on one or more locations and/or based on a route through urban area 200.

Further, the city toll may be dynamically adapted based on date and/or time. In this manner, the pricing scheme may be adapted during peak hours when traffic is typically much more severe than during off-peak hours. Therefore, the city toll for region 210, which may include one or more routes frequently used during peak hours, may be increased during peak hours (e.g. on weekdays between 7 am and 9 am and between 3 pm and 6 pm). The pricing scheme for regions 220, 230 may be adapted, too. For example, during holidays or on weekends, the city toll may be reduced for one or more regions.

Also, the city toll may be dynamically adapted based on pollution levels determined for one or more regions. In this manner, vehicle traffic may be restricted during times in which increased pollution levels are detected or during times in which such increased pollution levels are expected. Additionally or alternatively, city toll may be adapted based on pollution (e.g. increased), thereby making it more expensive to use a vehicle during times of increased pollution. In a similar manner, additionally or alternatively, parking fees may be increased during times of increased pollution also in order to make it more expensive to use a vehicle during such times. All these measures may be dynamically adapted so that conditions, restrictions, pricing schemes, and/or incentives may be adapted once the pollution returns to acceptable levels.

With respect to other modes of transportation, this may have effects, too. For example, the pricing for public transport may be adapted (e.g. decreased) in order to provide an incentive for travelers to use public transport instead of individual vehicles during times of increased pollution.

In a first example based on the urban area 200 and the partitioning shown in FIG. 2, a user intends to travel along route 86 through regions 210 and 220, with the starting location being located outside of urban are 200 and the destination being located in region 230. The vehicle 80 is of the PHEV type, which facilitates operation using the ICE, electric drive, or a combination thereof. In this first example, the following regulations regarding city toll are in place:

Region 210:
 City toll—EV: 0.02 €/km (weekdays Mon-Fri)
 City toll—PHEV: 0.02 €/km (weekdays Mon-Fri)
 City toll—ICE: 0.03 €/km (weekdays Mon-Fri)
 No city toll on weekends (all vehicles)
Region 220:
 City toll—EV: free
 City toll—PHEV: free if operated in electric drive (e.g. >80% electrically driven km in a specific urban area), otherwise charged as ICE
 City toll—ICE: 0.04 €/km
Region 230:
 City toll—EV: 0.01 €/km (+10% surcharge 8 am-10 am, 4 pm-6 pm)
 City toll—PHEV: 0.03 €/km (+10% surcharge 8 am-10 am, 4 pm-6 pm)
 City toll—ICE: 0.04 €/km (+10% surcharge 8 am-10 am, 4 pm-6 pm)

In order to prepare for driving into the city, the user may specify the route 86 by providing a destination to a navigation system implemented on the control unit 120 of the vehicle 80. The navigation system may generate a recommended route based on known criteria, for example, the shortest travel time or the shortest distance. In the first example, the navigation system has provided the route 86 as shown in FIG. 2.

The route 86 may then be transmitted to a backend component 150 in order to request transportation parameters pertaining to the route 86 and an intended travel time (e.g. starting immediately). The backend component 150 may be contacted, for example, using a data communication 140 as described above. The backend component 150 has access to transportation parameters and environmental parameters pertaining to urban area 200, for example parameters indicative of the regions 210, 220, 230, parameters indicative of the city toll and restrictions, etc. The parameters may be stored on a database 156 or be otherwise accessible by backend component 150 (e.g. through cloud services 160). The backend component 150 may determine any regions the route 86 leads through, in this first example, regions 210, 220, 230, and determine, based on the intended travel time, the city toll information. The backend component 150, thus, can provide transportation parameters indicative of the city toll in place for the regions that the user intends to travel through.

In the first example, the backend component 150 merely provides all relevant transportation parameters irrespective of the type of vehicle 80. The user can receive the transportation parameters using the control unit 120 in the car (e.g. directly via the navigation system) and, thus, be provided not only with a route and an estimated time of arrival, but also with projected costs for the trip. The costs for the trip may, thus, depend on an operating mode of the vehicle 80. If the vehicle 80 is operated in ICE mode throughout the trip, the costs are expected to be higher than when the vehicle 80 is operated in electric drive. The user can further select a corresponding operating mode of the vehicle 80 based on the transportation parameters provided by the backend component 150. Or the navigation system proposes an alternative mode of transportation or a combination of modes of transportation, for example parking the privately-owned ICE vehicle at a park-and-ride facility and switching to a BEV car-sharing vehicle—or even changing over to public transportation.

In preferred embodiments, the navigation system may further optimize, based at least in part on the transportation parameters, the route in terms of costs. This may include finding a route that fulfils specific requirements in terms of costs associated with the route (e.g. the costs being minimal) and/or finding a mode of transportation and/or an operating mode (e.g. for a vehicle; electric or ICE) for an existing route in order to optimize costs.

In preferred embodiments, the user device 120, 125 may be configured to provide an optimized (e.g. cost-optimized) driving mode recommendation where the control unit 120 of the vehicle 80 is configured to provide a recommendation for an optimized driving mode for each region 210, 220, and 230, which the vehicle 80 travels through along the route 86. The user of the vehicle 80 may, thus, be alerted to switch an operating mode of the vehicle 80 according to the recommendation made and, thus, optimize the trip made (e.g. in terms of costs, i.e. city toll).

In other preferred embodiments, the control unit 120 may be configured to provide an optimized (e.g. cost-optimized) driving mode recommendation where the control unit 120 of the vehicle 80 is configured to automatically select a cost-optimized driving mode for each region 210, 220, and 230, which the vehicle 80 travels through along the route 86, without an interaction of the user being necessary. In this manner, the control unit 120 may select an optimized driving mode for each region of the trip, thereby optimizing the trip in terms of costs for city toll.

The above may also be facilitated by a mobile device 125 of the user, which can provide the transportation parameters to the control unit 120 of the vehicle 80, if the data communication with the backend component 150 is conducted using the mobile device 125.

One illustrative example, in which the system 100 may preferably be implemented on a user's device, such as a mobile device 125, is the domain of car sharing. When using car sharing services, the vehicles that a user is travelling with typically change frequently, such that each trip is usually done using a different vehicle. In such cases, the user may provide a corresponding application program (e.g. App) on the mobile device 125 with all necessary information (e.g. profile information including name, address, driver's license, payment options, etc.) in order to be able to use the system 100. The mobile device 125 may communicate directly with the backend component 150 in order to provide the backend component with route information and/or transportation requests, etc. and in order to receive transportation parameters from the backend component 150. In preferred embodiments, the mobile device 125 is in data communication with the respective vehicle currently in use and may receive, for example upon request, transportation parameters from the vehicle (e.g. VIN no., type of vehicle, current mode of operation, position; see above). In such cases, all or at least part of the user's interaction with system 100 may be conducted via user interface 110' of mobile device 125. The general process of sending a transportation request (e.g. including route information, transportation parameters) may be substantially the same as in the first example described above, except for the user interacting more or exclusively with the user interface 110' of the mobile device 125. In such cases, the navigation system of a vehicle may be used as described above, although a corresponding application program (e.g. navigation app) running on the mobile device 125 may also be used.

In a second example based on the first example, the traffic authority managing the urban area 200 detects increased levels of pollution, for example due to particular weather conditions. In response to this, the system 100 may provide several measures in order to direct, regulate, or control traffic. First, pricing for public transport may be adapted (e.g. fares may be lowered) in order to provide additional or increased incentives for users to make use of public transport. Second, city toll may be temporarily increased for vehicles operating in ICE mode and for ICE vehicles (e.g. an increase of 50%) and/or for regions affected by the increased levels of pollution. Third, zero emission vehicles (e.g. BEV, HEV, PHEV) may be temporarily exempted from all city toll, or a reduction (e.g. −50%) may be offered. Fourth, regions affected by the increased levels of pollution may be subject to restrictions such that vehicles operating in ICE mode and for ICE vehicles may be temporarily banned from entering such regions. Such restrictions may also be based on particular restriction regulations, based on which, for example, only a portion of registered vehicles may enter such regions. An example restriction regulation may include selecting vehicles based on license plate or VIN numbers, such that on one day only vehicles having an even number may be operated, while on other days only vehicles having an odd number may be operated within such regions.

Generally, with respect to the first and second examples, the system 100 may be configured to provide transportation parameters pertaining to multiple modes of transportation in order to provide a user with alternative options regarding a transportation request. For example, the system 100 may be configured to provide alternative routes to a user, which have the same destination as the route 86 provided by the user. Such alternative routes may be limited to the same mode of transportation as route 86, but provide some advantages or optimization to the user (e.g. shorter route, fasters route, cheaper route). Such alternative routes may alternatively include one or more alternative modes of transportation and, in particular, a combination of multiple modes of transportation. In the first and second examples described above, the user may be provided with one or more alternative routes including the use of public transport. In such an alternative route, the user may be provided with the option to leave their vehicle 80 at a park-and-ride location, where the user can change over to another mode of transportation, such as public transport. The system 100 may be configured to provide the user with individual route information (e.g. pertaining to cost, travel time, distance) so that the user may determine the preferred mode or modes of transportation to use.

Some embodiments may include a social scoring system, which is configured to track the transportation behavior of users and to award points or penalties for individual transportation that the user is involved in. For example, a user may be awarded points for using environmentally-friendly modes of transportation while the same user may receive a penalty for using other modes of transportation Further, a user may be awarded points for avoiding peak-hours of public transport and/or travelling with a vehicle during rush hour, while failing to avoid may result in a penalty. The system 100 may be configured to provide transportation parameters based, at least in part, on a social score associated with a user.

Figure 3:
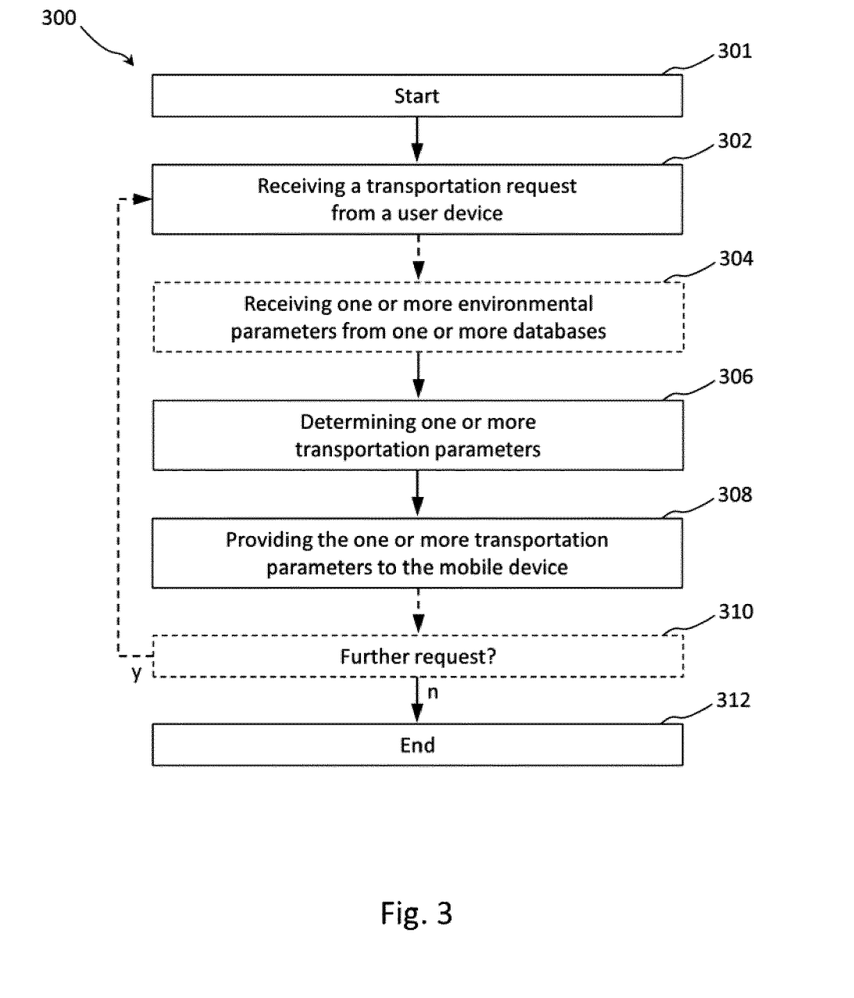
FIG. 3 shows a flow chart of a method for determining one or more transportation parameters in accordance with embodiments of the present invention.

FIG. 3 shows a flow chart of a method 300 for determining one or more transportation parameters in accordance with embodiments of the present invention. The one or more transportation parameters are indicative of one or more modes of transportation of a plurality of modes of transportation, and each mode of transportation of the plurality of modes of transportation is indicative of transportation of one or more users in a transportation environment. The method 300 starts at step 301.

In step 302, a transportation request is received from a user device 120, 125. The user device may include a control unit 120 of a vehicle 80 and/or a mobile device 125 of a user. In preferred embodiments, the user device may include either the control unit 120 or the mobile device 125 or a combination of both and the system 100 may be configured to facilitate seamless integration and/or handover from one to the other. This means that a user may initiate a request using a mobile device 125, for example while being on the way to a vehicle 80, while the request is being processed, the user may enter the vehicle 80 and the mobile device 125 may connect to the control unit 120 of the vehicle 80. Subsequently, the transportation parameters requested by the user may be not only received at the or via the mobile device 125 but directly at the or via the control unit 120. The same may be achieved the other way around, for example when a user has started a trip in a vehicle 80 and continues the trip, at some point along the way, using a different mode of transportation (e.g. public transport, car-sharing; see above), in which case there is a transparent handover from the control unit 120 of the vehicle 80 (which may be parked at a park-and-ride facility) to the mobile device 125 (e.g. a smart phone of the user), which is being taken by the user on the remainder of the trip.

In step 304, optionally, the one or more environmental parameters are received from one or more databases 156 in data communication with one or more backend components 150. As described above, the one or more backend components, which may be configured to perform the steps of method 300, may include one or more servers and/or one or more services, and be operated by one or more (different) entities. The environmental parameters may preferably be obtained from different databases 156 and/or different data sources in general (e.g. from databases 156 and/or from cloud servers/services and/or other sources). In preferred embodiments, the user device 120, 125 may be in data communication 140 with a single server and/or service, which in turn provides the user device 120, 125 with a single interface (e.g. application programming interface, API) connecting the user device 120, 125 to a multitude of further servers and/or services.

In step 306, the one or more transportation parameters are determined based on the transportation request, one or more transportation mode parameters, and one or more environmental parameters. The one or more transportation parameters are, for each mode of transportation of the plurality of modes of transportation, indicative of a respective mode of transportation. This means that for each mode of transportation, the transportation mode parameters are indicative of (e.g. define) the mode of transportation in terms of information required to use the mode of transportation and/or in terms of information required to integrate the mode of transportation into a trip. The one or more environmental parameters (see above) are indicative of the transportation environment in which the one or more modes of transportation are destined to be used. As described above, determining the one or more transportation parameters takes the aforementioned parameters into account in order to provide transportation parameters that allow for an optimization of a trip defined by the transportation request. In other words, a user or user device may generate a request upon a destination being provided and initiate method 300 in order to determine corresponding transportation parameters allowing for the realization of the trip.

In step 308, the one or more transportation parameters are provided to the mobile device 120, 125. As described above, the one or more transportation parameters may be provided to the control unit 120 of a vehicle and/or to the mobile device 125.

At step 310, it is optionally determined whether a further request needs processing. If so, the method is repeated from step 302. In preferred embodiments, the method 300 is performed by the one or more backend components 150, wherein the one or more backend components 150 are configured to continuously wait for transportation requests being received from one or more user devices 120, 125. Upon each transportation request, the above-described steps 302 to 308 are then performed by the one or more backend components 150.

The method 300 ends at step 312.

Figure 4:
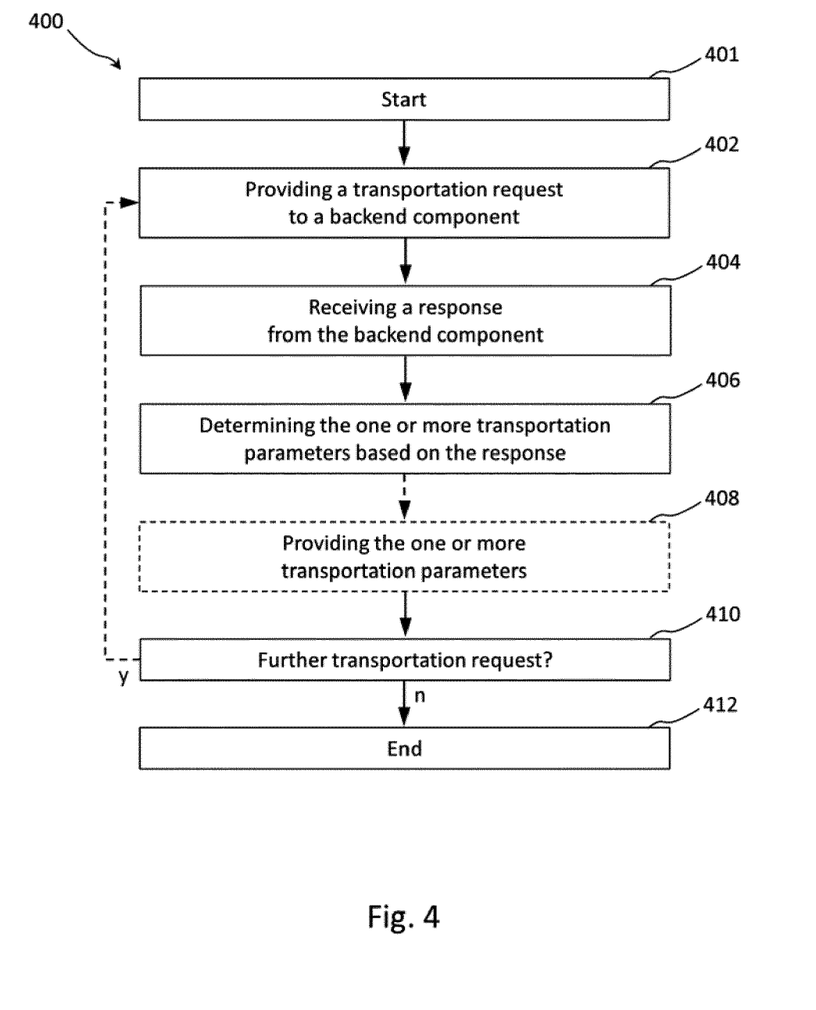
FIG. 4 shows a flow chart of a method for determining one or more transportation parameters in accordance with embodiments of the present invention.

FIG. 4 shows a flow chart of a method 400 for determining one or more transportation parameters in accordance with embodiments of the present invention. The one or more transportation parameters are indicative of one or more modes of transportation of a plurality of modes of transportation. Each mode of transportation of the plurality of modes of transportation is indicative of transportation of one or more users in a transportation environment. The method 400 starts at step 401.

In step 402, a transportation request is provided to one or more backend components 150. The transportation request may comprise one or more of a starting location, a destination, and one or more routes. Each route of the one or more routes are indicative of a transportation connection between a starting location and a destination. Further, the transportation request may include current transportation parameters indicative of a transportation mode currently in use by a user or indicative of a transportation mode a user intends to use in association with the transport request. In other words, when a user device provides the transportation request to one or more backend components 150, the request may include an intended destination (e.g. defined by user input), a starting location (e.g. provided by the user device, for example by GPS), and/or an intended route (e.g. one provided by a navigation system). The transportation request may further comprise information about the mode of transportation, for example including current (e.g. which operating mode is currently engaged) and fixed (e.g. type of vehicle, specifications, emission rating) vehicle parameters. A user may further include in the transportation request one or more desired modes of transportation that the user is inclined to use and/or one or more undesired modes of transportation that the user is not inclined to use.

In step 404, a response from the one or more backend components 150 is received. And, in step 406, the one or more transportation parameters indicative of the one or more modes of transportation are determined based on the response. The one or more transportation parameters may then be used by the user device 120, 125 in several ways. For example, the user may be provided with a cost estimate for a planned trip and/or with a choice of several alternative routes for the same trip (e.g. same destination), along with associated costs. In the case of an autonomous vehicle, the vehicle may be configured to determine, based on the transportation parameters, an optimized route for pre-programmed trip.

At step 410, it is optionally determined whether a further request needs processing by the one or more backend components 150. If so, the method is repeated from step 402. In preferred embodiments, the method 400 is performed by the user device 120, 125, wherein the user device 120, 125 is configured to continuously provide transportation requests to the one or more backend components, as long as one or more requests are pending and/or awaiting a response. Upon each transportation request, the above-described steps 402 to 408 are performed by the user device 120, 125.

The method 400 ends at step 412.

The invention claimed is:

1. A method for determining one or more transportation parameters indicative of one or more modes of transportation of a plurality of modes of transportation, each mode of transportation of the plurality of modes of transportation being indicative of transportation of one or more users in a transportation environment, the method comprising:
   receiving a transportation request from a user device;
   determining the one or more transportation parameters based on:
      the transportation request,
      one or more transportation mode parameters for each mode of transportation of the plurality of modes of transportation, each of the one or more transportation mode parameters being indicative of a respective mode of transportation, and
      one or more environmental parameters indicative of the transportation environment in which the one or more modes of transportation are destined to be used;
   providing the one or more transportation parameters to the user device, wherein the one or more transportation parameters include a mode of operation of a vehicle, and the mode of operation includes at least one of an internal combustion engine mode or an electric drive mode; and
   operating the vehicle according to the mode of operation.

2. The method according to claim 1, wherein the environmental parameters include regulatory parameters indicative of one or more restrictions placed on the transportation of the one or more users in the transportation environment.

3. The method according to claim 2, wherein the regulatory parameters include at least one of:
   payment parameters indicative of one or more payments associated with use of one or more of the modes of transportation; or
   restriction parameters indicative of the applicability of one or more of the modes of transportation.

4. The method according to claim 1, wherein the one or more environmental parameters include at least one of:
   one or more regions, each region of the one or more regions being configured to be associated with one or more of the transportation parameters;
   one or more temporal parameters, each temporal parameter of the one or more temporal parameters being indicative of at least one of a time point, time period, day, time of day, weekday, weekend day, or holiday;
   one or more weather parameters, each weather parameter of the one or more weather parameters being indicative of a weather condition; or
   one or more event parameters, each event parameter of the one or more event parameters being indicative of an event type, an event occurrence, and an event period.

5. The method according to claim 4, wherein the weather condition includes at least one of precipitation, temperature, wind direction, wind speed, radiation, wind-chill, or visibility.

6. The method according to claim 1, wherein the one or more transportation parameters are indicative of a least two modes of transportation of the plurality of modes of transportation, enabling transportation of the one or more users in a transportation environment based on the at least two modes of transportation.

7. The method according to claim 1, further comprising receiving the one or more environmental parameters from one or more databases in data communication with one or more backend components.

8. A method for determining one or more transportation parameters indicative of one or more modes of transportation of a plurality of modes of transportation, each mode of transportation of the plurality of modes of transportation being indicative of transportation of one or more users in a transportation environment, the method comprising:
providing a transportation request to one or more backend components;
receiving a response from the one or more backend components;
determining the one or more transportation parameters indicative of the one or more modes of transportation based on the response, wherein the one or more transportation parameters include a mode of operation of a vehicle, and the mode of operation includes at least one of an internal combustion engine mode or an electric drive mode; and
operating the vehicle according to the mode of operation.

9. The method according to claim 8, wherein the transportation request includes current transportation parameters indicative of a transportation mode currently in use by a user or indicative of a transportation mode a user intends to use in association with the transportation request.

10. The method according to claim 8, further comprising:
determining a preferred mode of transportation based on the one or more transportation parameters.

11. The method according to claim 10, further comprising:
providing the preferred mode of transportation to a navigation system implemented on a user device; or
providing the preferred mode of transportation to a user.

12. The method according to claim 8, further comprising:
providing the one or more transportation parameters to a navigation system implemented on a user device; or
providing the one or more transportation parameters to a user.

13. The method according to claim 8, further comprising providing the one or more transportation parameters to a navigation system configured to determine a route based on the one or more transportation parameters.

14. The method according to claim 13, wherein the navigation system is implemented on at least one of a control unit of the vehicle or a user device.

15. The method according to claim 8, wherein the transportation request comprises at least one of:
a starting location;
a destination; or
one or more routes, each route of the one or more routes being indicative of a transportation connection between a starting location and a destination.

16. The method according to claim 8, wherein the transportation request includes one or more second transportation parameters indicative of one or more modes of transportation of a plurality of modes of transportation.

17. The method according to claim 16, wherein the one or more second transportation parameters are indicative of parameters pertaining to at least one of the vehicle or a user.

* * * * *